United States Patent
Rothermel

(10) Patent No.: US 12,348,308 B2
(45) Date of Patent: Jul. 1, 2025

(54) BURST ERROR CORRECTION

(71) Applicant: CORNELIS NETWORKS, INC., Wayne, PA (US)

(72) Inventor: Brent R. Rothermel, Wayne, PA (US)

(73) Assignee: Cornelis Networks, Inc., Wayne, PA (US)

(*) Notice: Subject to any disclaimer, the term of this patent is extended or adjusted under 35 U.S.C. 154(b) by 394 days.

(21) Appl. No.: 17/817,352

(22) Filed: Aug. 23, 2022

(65) Prior Publication Data

US 2024/0072926 A1   Feb. 29, 2024

(51) Int. Cl.
*H04L 1/00* (2006.01)
*H04L 43/0852* (2022.01)

(52) U.S. Cl.
CPC .......... *H04L 1/0009* (2013.01); *H04L 1/0057* (2013.01); *H04L 43/0852* (2013.01)

(58) Field of Classification Search
CPC .. H04L 1/0009; H04L 1/0057; H04L 43/0852
See application file for complete search history.

(56) References Cited

U.S. PATENT DOCUMENTS

| | | | |
|---|---|---|---|
| 2005/0185729 A1* | 8/2005 | Mills | H04L 1/0071 375/267 |
| 2010/0211857 A1* | 8/2010 | Kobayashi | G11B 20/1833 714/752 |
| 2016/0028992 A1* | 1/2016 | Heatley | H04N 7/147 348/14.13 |
| 2016/0373557 A1* | 12/2016 | Sikkink | H04L 69/22 |
| 2018/0091332 A1* | 3/2018 | Rothermel | H04L 1/0047 |
| 2019/0179364 A1* | 6/2019 | Ganfield | G06F 1/14 |
| 2020/0389225 A1* | 12/2020 | Peleg | H04W 52/24 |
| 2022/0035707 A1* | 2/2022 | Laurent | G06F 11/1076 |

* cited by examiner

*Primary Examiner* — Christine Ng
(74) *Attorney, Agent, or Firm* — H. Artoush Ohanian; OhanianIP PLLC

(57) ABSTRACT

Methods, systems, and switches for burst error correction of packets in a high-performance computing ('HPC') environment are provided. Embodiments include receiving, at a switch, one or more packets and one or more codewords associated with the one or more packets; determining, by the switch in dependence upon a link-level replay latency algorithm, whether forward error correction has higher latency than a link-level replay; and if link-level replay has less latency than forward error correction, requesting, by the switch, a link-level replay; and using forward error correction if forward error correction has less latency.

20 Claims, 10 Drawing Sheets

BURST ERROR CORRECTION

BACKGROUND

High-Performance Computing ('HPC') refers to the practice of aggregating computing in a way that delivers much higher computing power than traditional computers and servers. HPC, sometimes called supercomputing, is a way of processing huge volumes of data at very high speeds using multiple computers and storage devices as a cohesive fabric. HPC environments often have thousands of compute nodes and switches connected with links in many dimensions and often in parallel in one dimension that form a complex network that transmit vast amounts of data requiring high throughput and low error rates at low latency. HPC makes it possible to explore and find answers to some of the world's biggest problems in science, engineering, business, and others.

Communications over HPC networks are implemented with packets. Reliable packet transmission requires infrastructure to receive and inspect packets, identify defective data, and administer and correct the defective data. Such infrastructure is useful in identifying burst errors in HPC networks due to link imperfections and length-dependent signal loss. A burst error is a string of corrupt data, often measured in length between—and including—the first and last error signals.

Redundant bits are often added to the data packet by the sender using an error-detecting (ED) code, such as a cyclic redundancy check (CRC). In this manner, the receiver compares the received error code to the error code expected by recalculating the error code using the received payload. If the received and calculated error codes differ, the received packet is erroneous. Receivers detecting a corrupted message may request that the sender resend the packet.

In contrast, forward error correction (FEC), or error-correcting code (ECC), is a process of a sender adding redundant data to a packet, such that the data may be recovered (up to the capability of the code being used) by a receiver even when errors were introduced during transmission.

It would be advantageous to have an efficient and effective mechanism to administer burst errors in a high-performance computing environment that uses FEC for detection instead of CRC.

BRIEF DESCRIPTION OF THE DRAWINGS

Many aspects of the present disclosure can be better understood with reference to the following drawings. The components in the drawings are not necessarily to scale, with emphasis instead being placed upon illustrating the principles of the disclosure. Moreover, in the drawings, like reference numerals designate corresponding parts throughout the several views.

DETAILED DESCRIPTION

Figure 1:
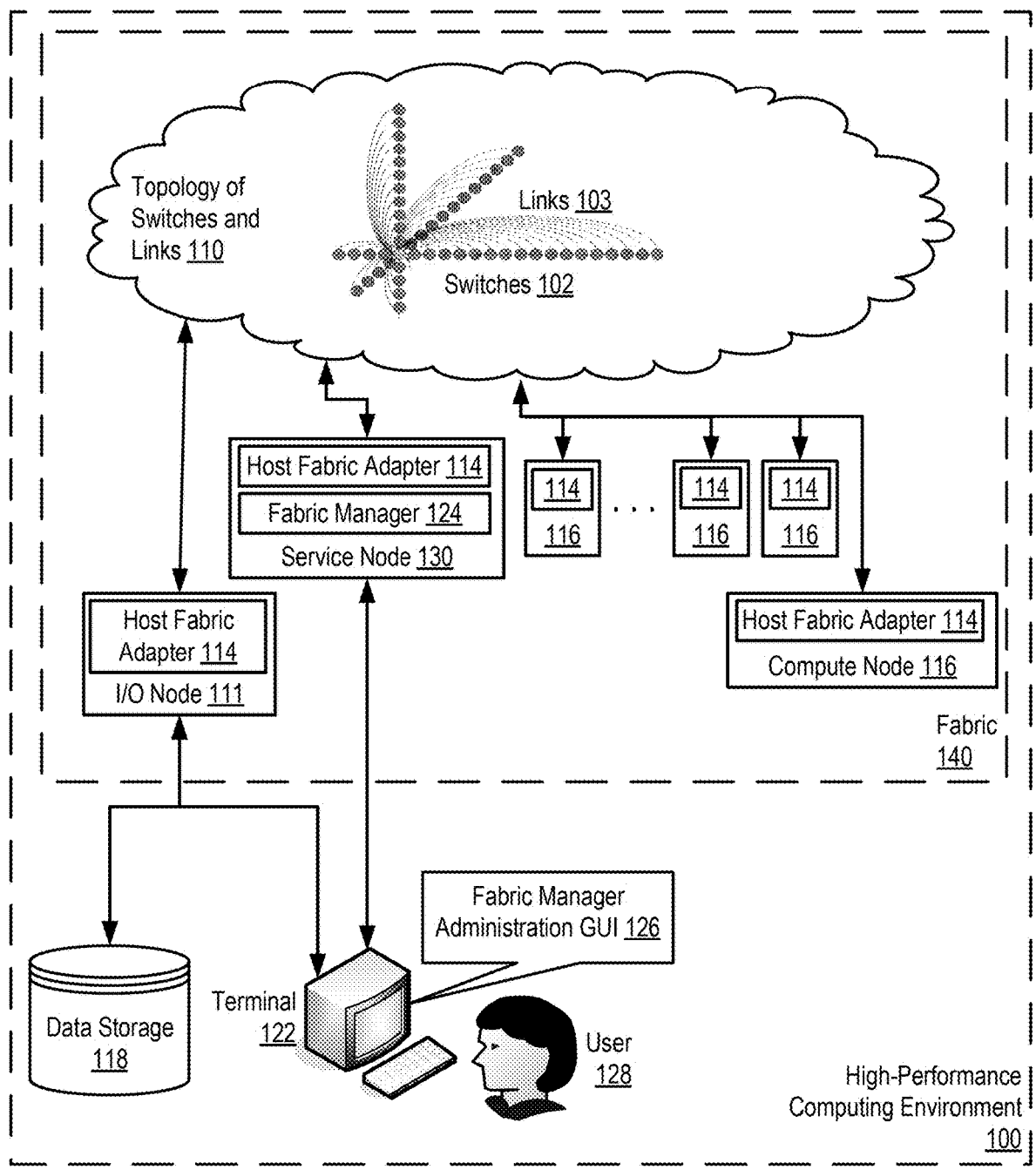
FIG. 1 sets forth a system diagram of an example high-performance computing environment useful in burst error correction according to some embodiments of the present invention.

Methods, systems, and products for burst error correction of packets in a high-performance computing ('HPC') environment are described with reference to the attached drawings beginning with FIG. 1. FIG. 1 sets forth a system diagram of an example high-performance computing environment (100) useful in burst error correction according to some embodiments of the present invention. Burst error correction according to embodiments of the present invention supports both exascale fabrics, as well as smaller fabrics.

As discussed below, burst error correction according to embodiments of the present invention in the example of FIG. 1 operates generally by receiving, at a switch, one or more packets and one or more codewords associated with the one or more packets and determining, by the switch, whether a forward error correction has higher latency than a link-level replay. If link-level replay has less latency than forward error correction, the system of FIG. 1 operates by requesting, by the switch, a link-level replay. If link-level replay does not have has less latency than forward error correction, the system of FIG. 1 operates by using forward correction error.

FIG. 1 sets forth a system diagram of an example high-performance computing environment (100) useful in burst error correction according to some embodiments of the present invention. The example high-performance computing environment of FIG. 1 includes a fabric (140) which includes an aggregation of a service node (130), an Input/Output ('I/O') node (111), a plurality of compute nodes (116) each including, a host fabric adapter ('HFA') (114), and a topology (110) of switches (102) and links (103). The service node (130) of FIG. 1 provides service common to pluralities of compute nodes, loading programs into the compute nodes, starting program execution on the compute nodes, retrieving results of program operations on the compute nodes, and so on. The service node of FIG. 1 runs a service application and communicates with users (128) through a service application interface that runs on computer terminal (122).

The fabric (140) according to the example of FIG. 1 is a unified computing system that includes linked nodes and switches that often look like a weave or a fabric when seen collectively. In the example of FIG. 1, the fabric (140) includes compute nodes (116), host fabric interfaces (114)

and switches (102). The switches (102) of FIG. 1 are coupled for data communications to one another with links to form one or more topologies (110).

The compute nodes (116) of FIG. 1 operate as individual computers including at least one central processing unit ('CPU'), volatile working memory-random access memory ('RAM') and non-volatile storage and connected to the switches (102) and links (103) through a host interface adapter (114). The hardware architectures and specifications for the various compute nodes vary and all such architectures and specifications are well within the scope of the present invention as will occur to those of skill in the art.

Non-volatile storage may store one or more applications or programs for the compute node to execute. Such non-volatile storage may be implemented with flash memory, rotating disk, hard drive or in other ways of implementing non-volatile storage as will occur to those of skill in the art.

In the example of FIG. 1, each compute node (116) has installed upon it or is connected for data communications with a host fabric adapter (114) ('HFA'). Host fabric adapters according to example embodiments of the present invention deliver high bandwidth and increase cluster scalability and message rate while reducing latency. The example HFA (114) of FIG. 1 connects a host such as a compute node (116) to the fabric (140) of switches (102) and links (103). The HFA adapts packets from the host for transmission through the fabric. The example HFA of FIG. 1 provides matching between the requirements of applications and fabric, maximizing scalability and performance.

The switches (102) of FIG. 1 are multiport modules of automated computing machinery, hardware and firmware, that receive and transmit packets. Typical switches (102) receive packets, inspect packet header information, and transmit the packets according to routing tables configured in the switch. Often switches are implemented as or with one or more application specific integrated circuits ('ASICs') as will occur to those of skill in the art. In many cases, the hardware of the switch implements packet routing and firmware of the switch configures routing tables, performs management functions, fault recovery, and other complex control tasks as will occur to those of skill in the art.

The switches (102) of FIG. 1 are configured for burst error correction according to embodiments of the present invention. The switches (102) receive one or more packets and one or more codewords associated with the packets and determine whether forward error correction has a higher latency than link-level replay. If link-level replay has less latency than forward error correction the switches (102) of FIG. 1 request a link-level replay. If forward error correction has less latency, the switches (102) of FIG. 1 use forward error correction.

The switches (102) of the fabric (140) of FIG. 1 are connected to other switches with links to form one or more topologies (110). A topology according to the example of FIG. 1 is the connectivity pattern among switches, HFAs, and the bandwidth of those connections. Switches and HFA's, and switches and other switches may be connected in many ways to form and many topologies, each designed to perform in ways optimized for their purposes. Example topologies useful in burst error correction according to example embodiments of the present invention include a Fat Tree (108), Dragonfly (106), MegaFly (112), HyperX (104), and many others as will occur to those of skill in the art. Examples of Fat Tree, Dragonfly, MegaFly and HyperX topologies are discussed below with reference to FIGS. 2-5. As will occur to those of skill in the art, the configuration of compute nodes, service nodes, I/O nodes, and many other components vary in various topologies.

The service node (130) of FIG. 1 has installed upon it a fabric manager (124). The fabric manager (124) of FIG. 1 is a module of automated computing machinery for configuring, monitoring, managing, maintaining, troubleshooting, and otherwise administering elements of the fabric. The example fabric manager (124) is coupled for data communications with a fabric manager administration module with a graphical user interface ('GUI') (126) allowing users (128) to configure and administer the fabric manager (124) and in so doing configure and administer the fabric (140).

The example of FIG. 1 includes an I/O node (111) responsible for input and output to and from the high-performance computing environment. The I/O node (111) of FIG. 1 is coupled for data communications to data storage (118) and a terminal (122) providing information, resources, GUI interaction and so on to a user (128).

The example system of FIG. 1 provides at each switch (102) and each HFA (144) automated computing machinery, hardware, firmware, or software to use FEC to detect error which is inherently a very low latency operation and using link-level replay to correct error. Because CRC is not well adapted to detect burst errors and FEC is well adapted to detect errors but FEC correction has high latency, instead of using FEC to correct errors a replay correction provides optimal low latency.

Figure 2:
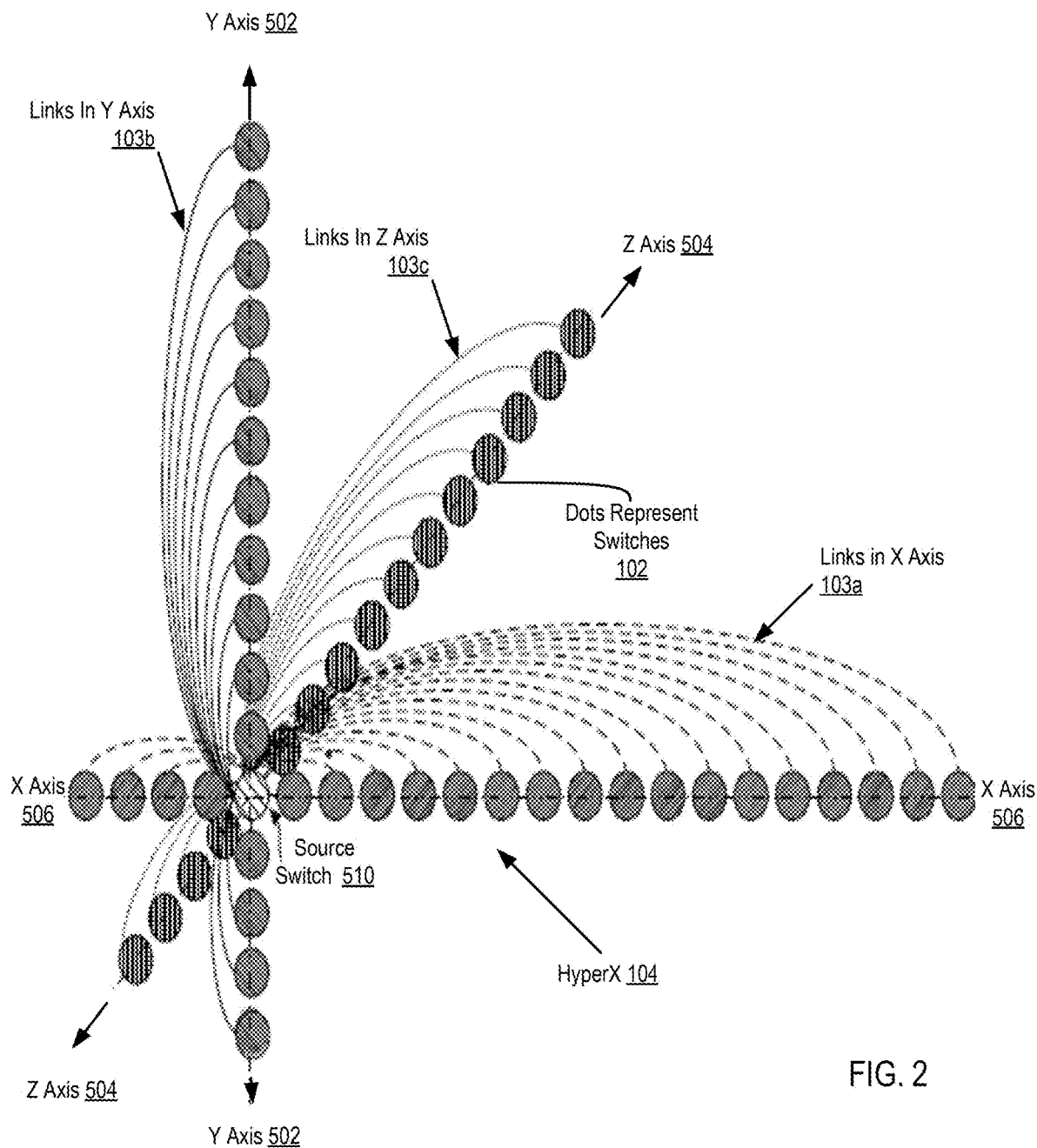
FIG. 2 sets forth a HyperX topology useful with and benefiting from burst error correction according to embodiments of the present invention.

As discussed above, a number of topologies are useful with and benefit from burst error correction according to embodiments of the present invention. For further explanation, FIG. 2 sets forth a topology useful with and benefitting from burst error correction according to embodiments of the present invention. The topology of FIG. 2 is implemented as a HyperX (104). In the example of FIG. 2, each dot (102) in the HyperX (104) represents a switch. Each switch (102) is connected by a link (103). The HyperX topology of FIG. 2 is depicted as an all-to-all topology in three dimensions having an X axis (506), a Y axis (502), and a Z axis (504).

In the example of FIG. 2, one example switch is described as the source switch (510). The example source switch (510) of these three dimensions is directly connected with every switch in the topology. The designation of the source switch (510) is for explanation and not for limitation. Each switch may be connected to other switches in a similar manner and thus each switch may itself be a source switch. That is, the depiction of FIG. 2 is designed to illustrate a HyperX topology with non-trivial scale from the perspective of a single switch—labeled here as the source switch (510). A fuller fabric has similar connections for all switches. For example, a set of switches may be implemented as a rectangular volume of many switches.

The example of FIG. 2 illustrates an expansive all-to-all network of switches implementing a HyperX topology. In HyperX, K is the terminology for the number of parallel links (103) between two individual switches (102). K=1 establishes connectivity between the switches, and K>1 increases the bandwidth of that connection.

Burst error correction according to the example of FIG. 2 operates generally in a HyperX topology by generally by receiving, at a switch (102, one or more packets and one or more codewords associated with the one or more packets and determining, by the switch, whether forward error correction has higher latency than a link-level replay. If link-level replay has less latency than forward error correction, requesting, by the switch (102), a link-level replay and using forward error correction if forward error correction has less latency.

Figure 3:
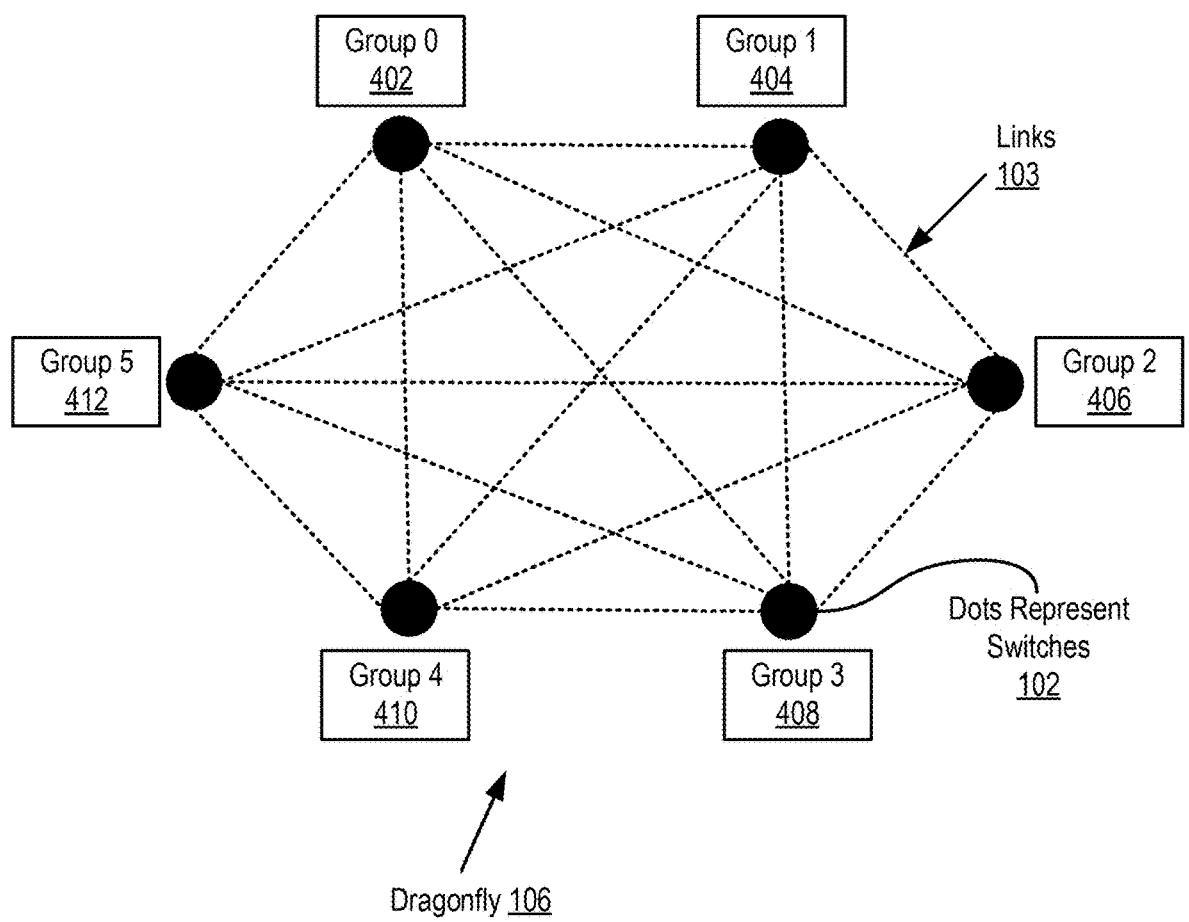
FIG. 3 sets forth a Dragonfly topology useful with and benefiting from burst error correction according to embodiments of the present invention.

Another topology both useful with and benefitting from burst error correction according to example embodiments of the present invention is Dragonfly. FIG. 3 sets forth a line drawing illustrating a set of switches (102) and links (103) implementing a Dragonfly topology. The example Dragonfly topology of FIG. 3 is provided for ease of explanation and not for limitation. In fact, the Dragonfly topology has many variants such as Canonical Dragonfly and others as will occur to those of skill in the art.

The example Dragonfly topology of FIG. 3 is depicted in a single dimension and is implemented as an all-to-all topology meaning that each switch (102) is directly connected to each switch (102) in the topology. Each switch (102) is also connected to a group (402-412) of switches and links. In some implementations, such all-to-all connections may be implemented in groups which in turn are connected to other groups.

The Dragonfly topology is typically defined as a direct topology in which each switch accommodates a set of connections leading to endpoints, and a set of topological connections leading to other switches. The Dragonfly concept often relies on the notion of groups (402-412). A collection of switches belonging to the same group are connected with intra-group connections, while switch pairs belonging to different groups are connected with inter-group connections. In some deployments, switches and associated endpoints belonging to a group are assumed to be compactly colocated in a very limited number of chassis or cabinets. This permits intra-group and terminal connections with short-distance and lower-cost electrical transmission links. In many cases, inter-group connections are based on optical equipment that is capable of spanning the tens of meters inter-cabinet distances.

Modularity is one of the main advantages provided by the dragonfly topology. Thanks to the clear distinction between intra- and inter-group links, the final number of groups present within one HPC environment does not affect the wiring within a group. Vendors can therefore propose all-included, all-equipped cabinets corresponding to a group, letting HPC developers and operators decide how many such groups, cabinets, racks and so on they want to acquire.

Burst error correction according to the example of FIG. 3 operates generally in a Dragonfly topology by generally by receiving, at a switch (102, one or more packets and one or more codewords associated with the one or more packets and determining, by the switch, whether forward error correction has higher latency than a link-level replay. If link-level replay has less latency than forward error correction, requesting, by the switch (102), a link-level replay and using forward error correction if forward error correction has less latency.

Figure 4:
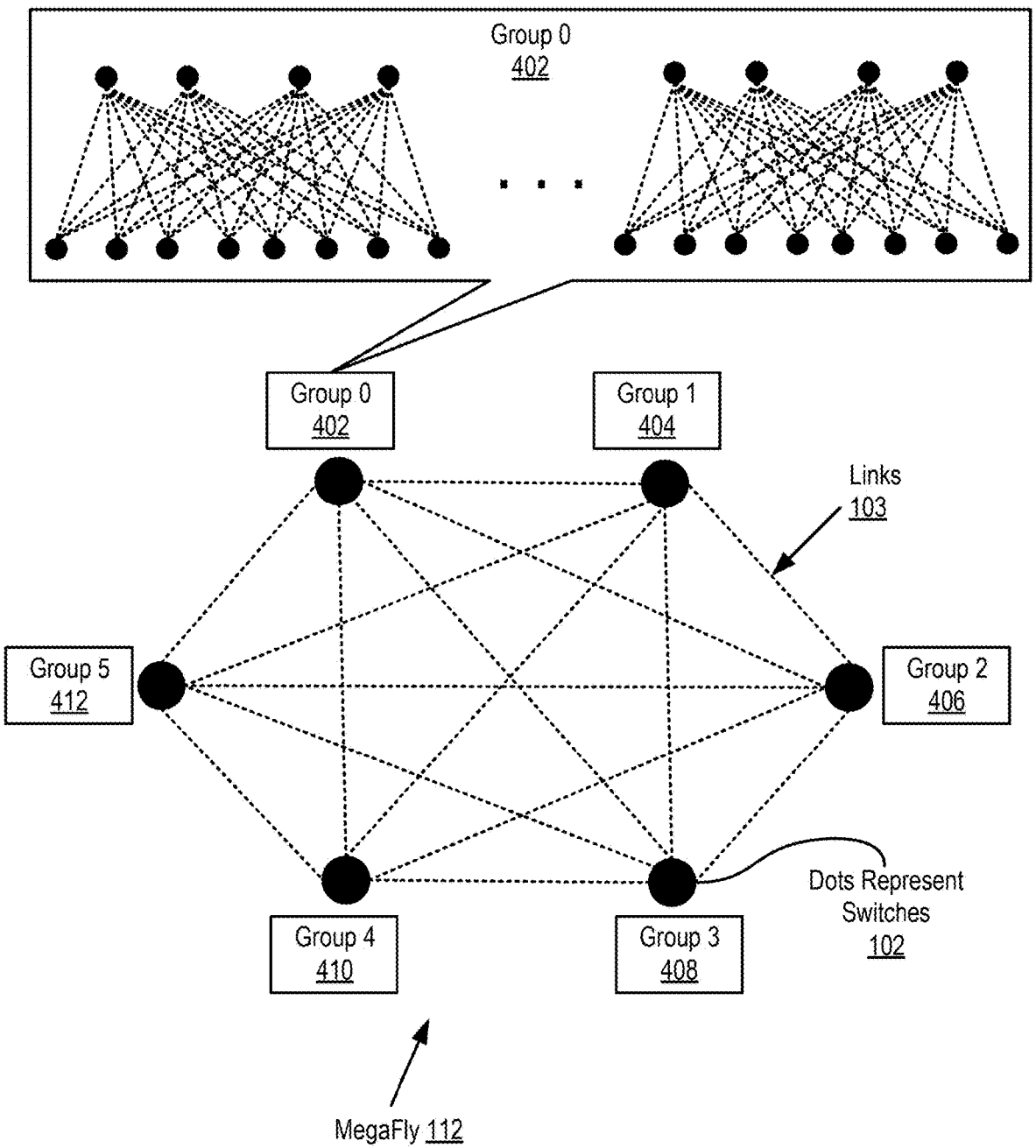
FIG. 4 sets forth a MegaFly topology useful with and benefiting from burst error correction according to embodiments of the present invention.

For further explanation, FIG. 4 sets forth another topology both useful with and benefitting from burst error correction according to embodiments of the present invention. The topology of FIG. 4 is implemented as a MegaFly (112). The MegaFly (112) topology of FIG. 4 is an all-to-all topology of switches (102) and links (103) among a set of groups— Group 0 (402), Group 1 (404), Group 2 (406), Group 3 (408), Group 4 (410), and Group 5 (412). In the example MegaFly topology of FIG. 4, within each group (402-412) is itself another topology of switches and links implemented as a two-tier fat tree (402), This configuration is illustrated as Group 0 (402) in this example.

Burst error correction according to the example of FIG. 4 operates generally in a MegaFly topology by generally by receiving, at a switch (102), one or more packets and one or more codewords associated with the one or more packets and determining, by the switch, whether forward error correction has higher latency than a link-level replay. If link-level replay has less latency than forward error correction, requesting, by the switch (102), a link-level replay and using forward error correction if forward error correction has less latency.

Figure 5:
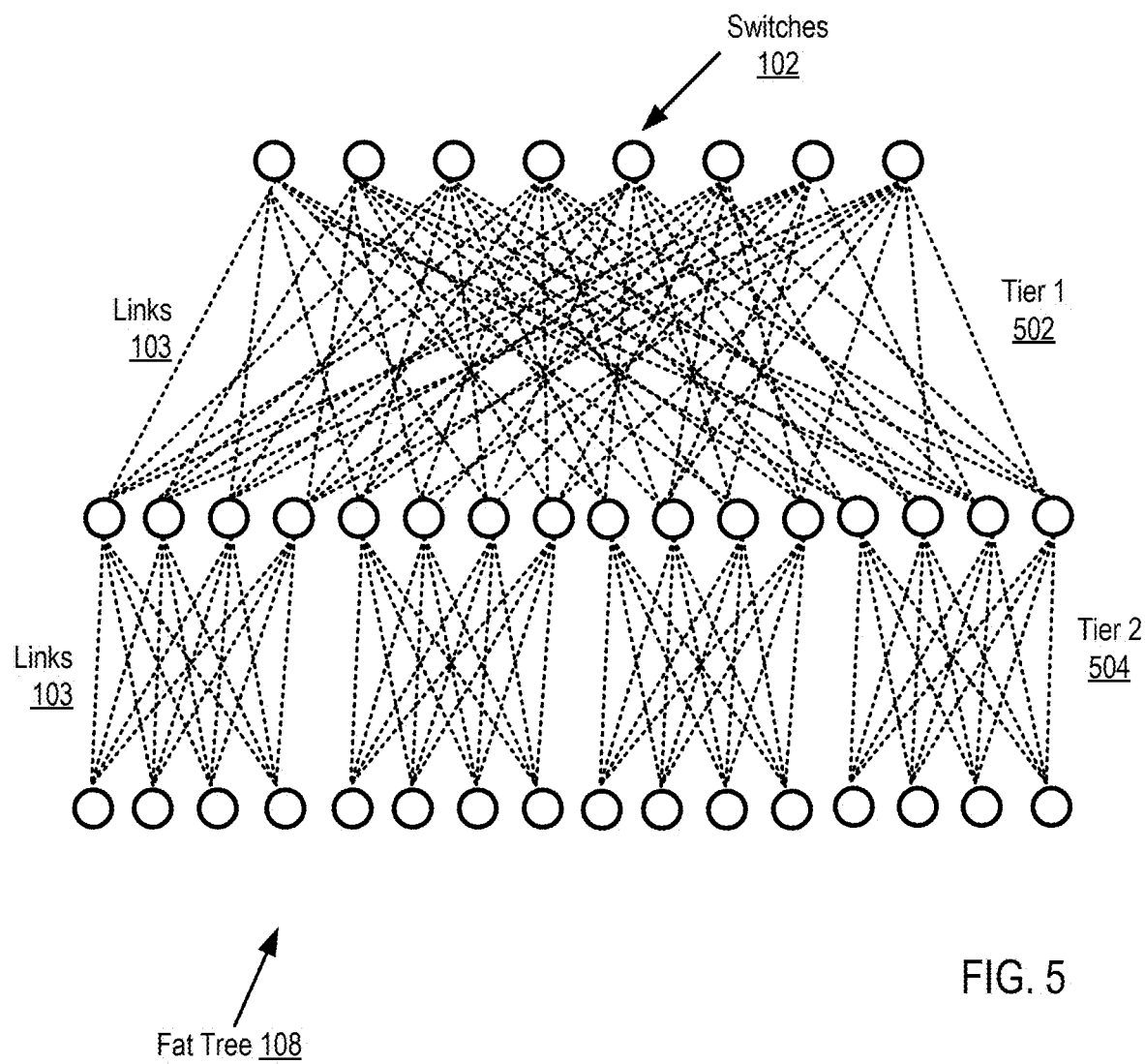
FIG. 5 sets forth a Fat Tree topology useful with and benefiting from burst error correction according to embodiments of the present invention.

While not an all-to-all topology such as HyperX, DragonFly, and MegaFly, FIG. 5 sets forth a line drawing of a topology implementing a Fat Tree (108). A Fat Tree is a topology which may benefit from burst error correction according to some particular embodiments of the present invention. In a simple tree data structure, every branch has the same thickness, regardless of their place in the hierarchy- they are all "skinny"—that is low-bandwidth. However, in a fat tree, branches nearer the top of the hierarchy are "fatter" than branches further down the hierarchy and therefore provide more bandwidth. The varied thickness (bandwidth) of the data links allows for more efficient and technology-specific use.

In the example of FIG. 5, each dot (102) in the Fat Tree (108) represents a switch. Each switch (102) is connected by a link (103). In the example of FIG. 2, the links are represented by dotted lines. The bandwidth provided by the links at the top hierarchy (Tier 1, 502) of the tree (108) between the switches in Tier 1 (502) provide more bandwidth between each switch than the links between each switch in Tier 2 (504).

Burst error correction according to the example of FIG. 5 operates generally in a Fat Tree topology by generally by receiving, at a switch (102), one or more packets and one or more codewords associated with the one or more packets and determining, by the switch, whether forward error correction has higher latency than a link-level replay. If link-level replay has less latency than forward error correction, requesting, by the switch (102), a link-level replay and using forward error correction if forward error correction has less latency.

Figure 6:
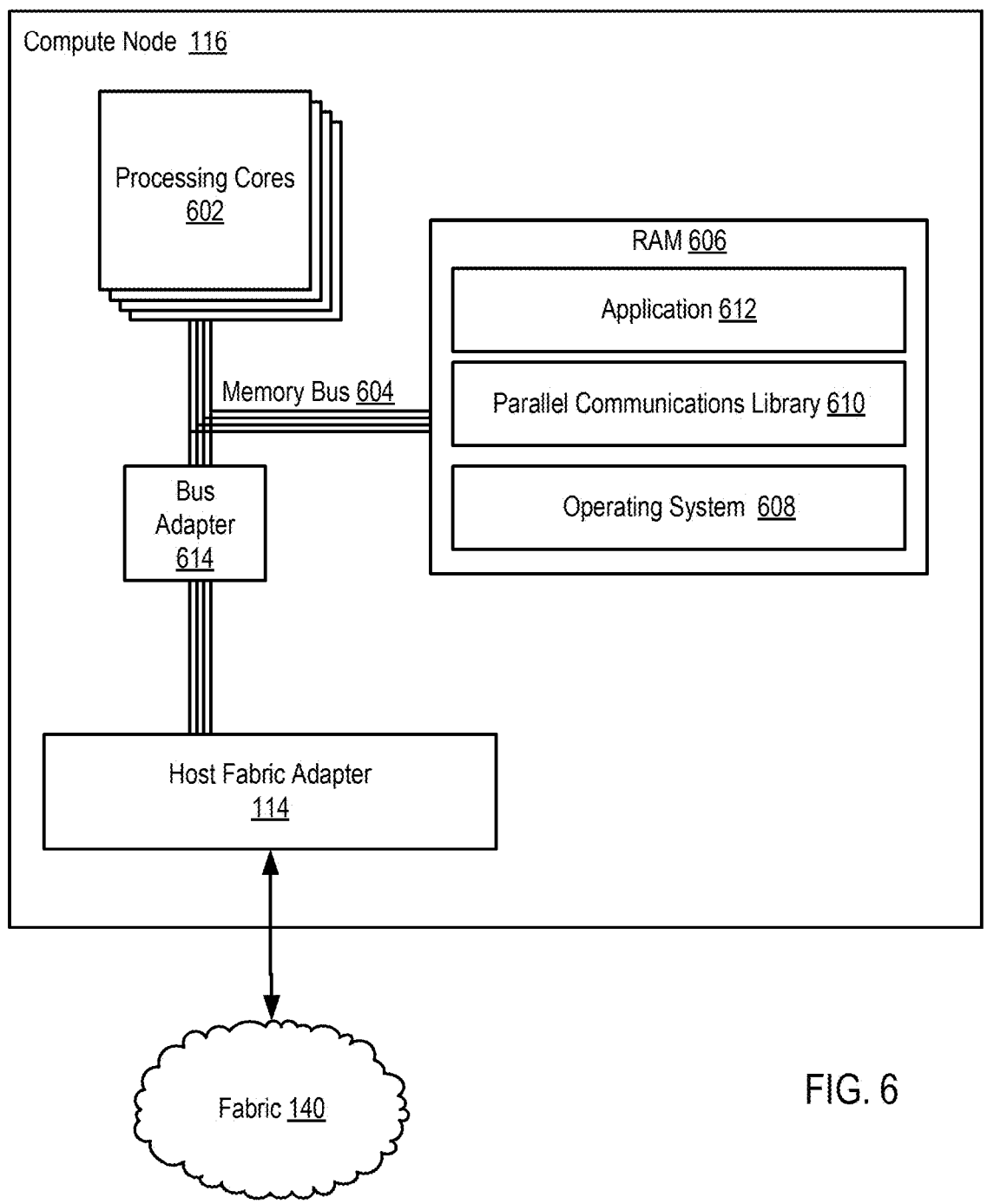
FIG. 6 sets forth a block diagram of a compute node useful in burst error correction according to embodiments of the present invention.

For further explanation, FIG. 6 sets forth a block diagram of a compute node useful in burst error correction according to embodiments of the present invention. The compute node (116) of FIG. 6 includes processing cores (602), random access memory ('RAM') (606) and a host fabric adapter (114). The example compute node (116) is coupled for data communications with a fabric (140) for high-performance computing. The fabric (140) of FIG. 6 is implemented as a unified computing system that includes linked nodes, switches, links, and other components that often look like a weave or a fabric when seen collectively. As discussed above, the nodes, switches, links, and other components, of FIG. 6 are also implemented as a topology—that is, the connectivity pattern among switches, HFAs, and the bandwidth of those connections.

Stored in RAM (606) in the example of FIG. 6 is an application (612), a parallel communications library (610), and an operating system (608). Common applications for high-performance computing environments often include applications for complex problems of science, engineering, business, and others.

A parallel communications library (610) is a library specification for communication between various nodes and clusters of a high-performance computing environment. A common protocol for HPC computing is the Message Passing Interface ('MPI'). MPI provides portability, scalability, and high-performance. MPI may be deployed on many distributed architectures, whether large or small, and each operation is often optimized for the specific hardware on which it runs.

The HFA (114) of FIG. 6 administers burst error correction according to embodiments of the present invention by receiving one or more packets and one or more codewords associated with the one or more packets; determining, in dependence upon a link-level replay latency algorithm, whether forward error correction has higher latency than a link-level replay; and if link-level replay has less latency than forward error correction, requesting a link-level replay; and using forward error correction if forward error correction has less latency.

Figure 7:
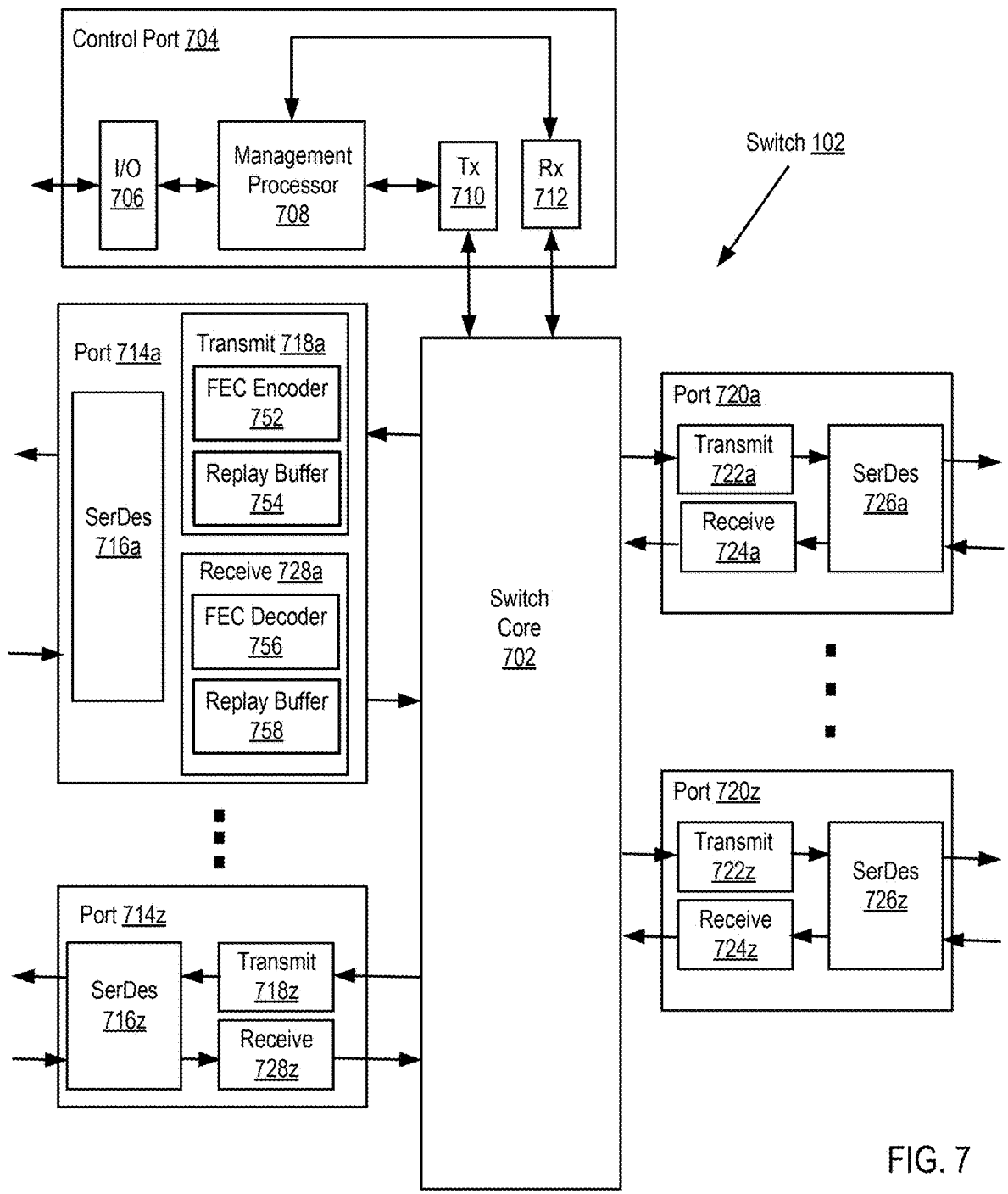
FIG. 7 sets forth a block diagram of an example switch useful in burst error correction according to embodiments of the present invention.

For further explanation, FIG. 7 sets forth a block diagram of an example switch. The example switch (102) of FIG. 7 includes a control port (704), a switch core (702), and a number of ports (714a-714z) and (720a-720z). The control port (704) of FIG. 7 includes an input/output ('I/O') module (706), a management processor (708), and a transmission (710) and reception (712) controllers. The management processor (708) of the example switch of FIG. 7 maintains and updates routing tables for the switch. In many embodiments, each receive controller maintains the latest updated routing tables.

The example switch (102) of FIG. 7 includes a number of ports (714a-714z and 720a-720z). The designation of reference numeral 714 and 720 with the alphabetical appendix of a-z is to explain that there may be many ports connected to a switch. Switches useful in burst error correction according to embodiments of the present invention may have any number of ports-more or less than 26 for example. Each port (714a-714z and 720a-720z) is coupled with the switch core (702) and has a transmit controller (718a-718z and 722a-722z) and a receive controller (728a-728z and 724a-724z).

Each port in the example of FIG. 7 also includes a Serializer/Deserializer (716a-716z and 726a-726z). A Serializer/Deserializer ('SerDes') is a pair of functional blocks commonly used in high-speed communications to compensate for limited input/output. These blocks convert data between serial data and parallel interfaces in each direction. The primary use of a SerDes is to provide data transmission over a single line or a differential pair in order to minimize the number of I/O pins and interconnects.

Each port (714a-714z and 720a-720z) in the example of FIG. 7 also includes a burst error correction module (750) that includes automated computing machinery for burst error correction according to embodiments of the present invention including receiving one or more packets and one or more codewords associated with the one or more packets and determining whether forward error correction has higher latency than a link-level replay. If link-level replay has less latency than forward error correction, requesting a link-level replay and using forward error correction if forward error correction has less latency.

In each transmit controller (718 a-z; 722 a-z) in the example of FIG. 7 resides a FEC encoder (752) and a replay engine (754). The FEC encoder (752) encodes the data to add the correction bits to the payload bits when transmitting data. The replay engine (754) retransmits data sequentially starting from the identified erroneous data.

In each receive controller (728 a-z; 724 a-z) resides a FEC decoder (756) and a replay engine (758). The FEC decoder decodes received data to identify data errors and correct the errors. The replay engine (758) requests that the sender retransmit data sequentially starting from the identified erroneous data.

While depicted in a switch (102), a transmit controller with a FEC encoder and a replay engine and a receive controller with a FEC decoder and a replay engine also often reside in the host fabric adapters (114 of FIG. 1) of the fabric.

Figure 8:
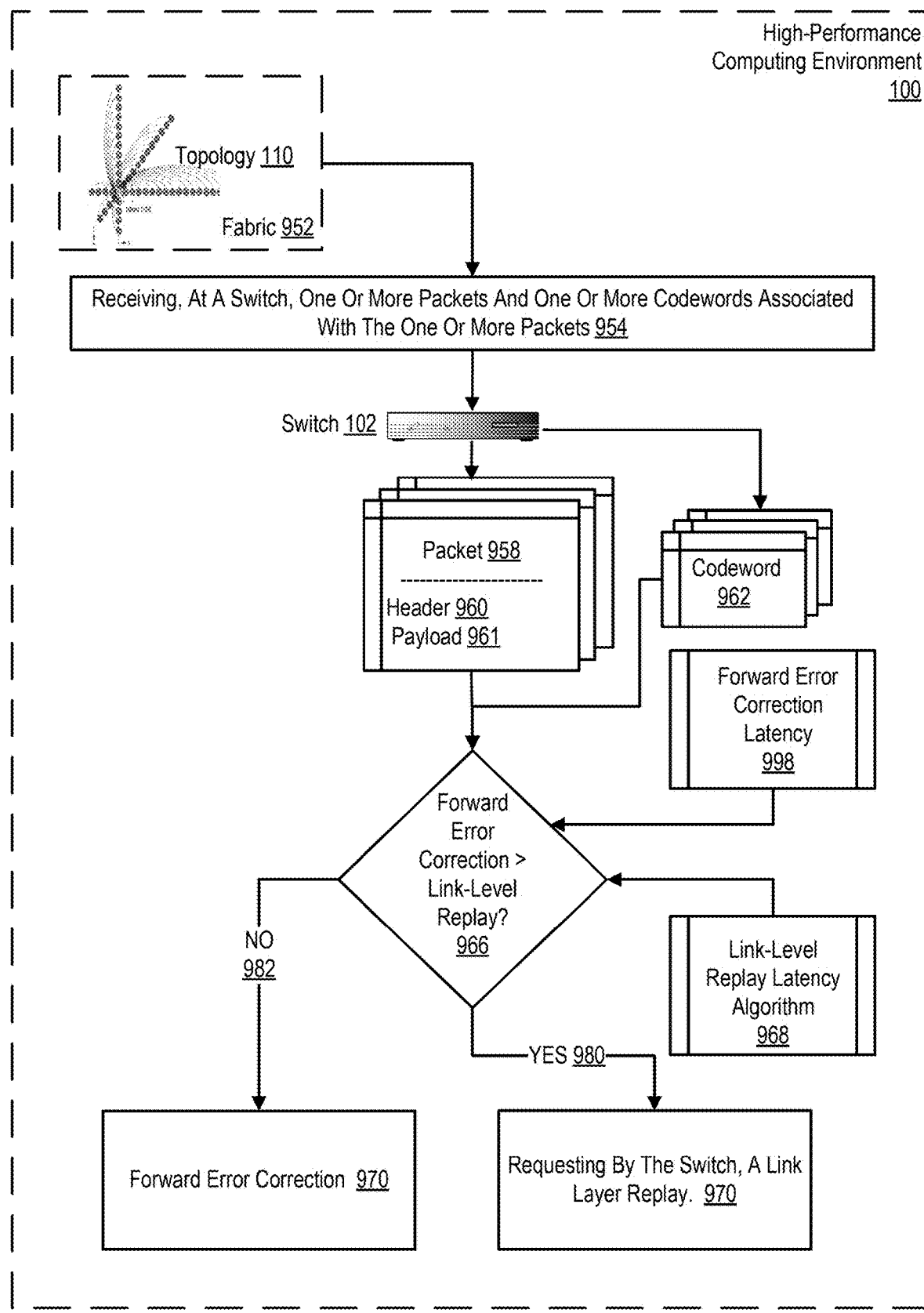
FIG. 8 sets forth a flowchart illustrating an example method of burst error correction according to embodiments of the present invention.

For further explanation, FIG. 8 sets forth a flow chart illustrating an example of burst error correction in a high-performance computing environment. As mentioned above, burst error is a string of corrupt data, often measured in length between—and including—the first and last error signals. The high-performance computing environment of FIG. 8 includes a plurality of links and switches. In the example of FIG. 8, the links and switches form a topology (110) of a fabric (140). The topology (110) of FIG. 8 is illustrated as a HyperX. This is for example and not for limitation. In fact, many topologies may usefully benefit from burst error correction according to embodiments of the present invention.

The method of FIG. 8 includes receiving (954), at a switch (102), one or more packets (958) and one or more codewords (962). A codeword is one or more error-correcting codes. In many embodiments of the present invention, codewords according to embodiments of the present invention are implemented as Reed-Solomon codes. Reed-Solomon codes operate on a block of data treated as a set of finite-field elements called symbols. Reed-Solomon codes are able to detect and correct multiple symbol errors. Reed-Solomon codes can detect, erroneous symbols, or locate and correct some symbols at unknown locations. Reed-Solomon codes are also suitable as multiple-burst bit-error correcting codes, since a sequence of some consecutive bit errors can affect multiple symbols.

A packet is a small amount of data sent over a network. Each packet includes a source and destination as well as the content (or data) being transferred. When the packets reach their destination, they are reassembled into a single file or other contiguous block of data. While the exact structure of a packet varies among protocols, a typical packet includes at least two sections—a header (960) and payload (961). Information about the packet is stored in the header. The payload section of a packet contains the actual data being transferred.

The method of FIG. 8 includes determining (966), by the switch (102) in dependence upon a link-level replay latency algorithm (970), whether forward error correction has higher latency than a link-level replay. As mentioned above, forward error correction (FEC), or error-correcting code (ECC), is a process of a sender adding redundant data to a packet, such that the data may be recovered (up to the capability of the code being used) by a receiver even when errors were introduced during transmission. The redundancy allows the receiver to detect a limited number of errors that may occur in the packet and to correct these errors. The redundant data or parity data is additional data bits added to the data packet, such that the packet includes payload bits (original data bits) and FEC bits. Example FEC codes for processing data include Hamming codes and Reed-Solomon codes. FEC enables error correction without retransmission of the data at the cost of a reduced bandwidth as the same redundant data is transmitted even if there are zero errors to correct. FEC also adds latency. The latency of the FEC decode and correction scales quadratically with the number of errors corrected. However, in order to maintain a consistent flow of data, the receiver must plan for the worst-case correction scenario and buffer the data when there are fewer errors.

The effective and average latency of replay is a function of link length, that is, how many packets are lost when an error is detected and a replay is needed, as well as the BER, number of errors per unit time. The lower the BER, the higher the number of packets transmitted with zero or low added latency, thereby reducing the average latency.

FEC is used instead of CRC for detection. Typical implementations of CRC cannot handle bursts of errors while FEC is more robust in such burst error detection. While typical CRC codes can guarantee detection of up to 3 bit errors in a codeword and can also detect a burst of length less than or equal to the CRC polynomial order, such a burst can only occur once in the codeword. As such, if for example, a burst of 3 consecutive bits occurred, as well as a single erroneous bit elsewhere in the same codeword, CRC would not be guaranteed to detect it. In contrast, FEC, errors are counted on a symbol basis, where each symbol is multiple bits—often 10 bits. The same 3+1 error signature described earlier for CRC would be detected as 2 symbol errors in FEC and fall well within detection capabilities of typical Reed Solomon FEC codes.

Link-level replay is error correction using retransmissions of data and may be referred to simply as replay, as the sequence of packets starting from the erroneous packet are retransmitted from the sender to the receiver. Retransmissions of data delays receipt of a data packet as well as every other data packet that is "on the wire" in transit. That is, packets sent after the corrupted data packet are also delayed. As data packet sequence must often be maintained, all subsequent packets on the wire must be rejected and retransmitted in sequence. If the wire is long, a significant number of packets may require retransmission, thereby increasing the effective latency and reducing the effective bandwidth of the link.

In the method of FIG. 8, if link-level replay has less latency than forward error correction (980), the method continues by requesting (970), by the switch (102), a link-level replay. Requesting (970) by the switch, a link-level replay includes identifying a corrupted packet and requesting from the last hop a retransmission of a sequence of one or more packets including the corrupted packet. As mentioned above, link-level replay may be carried out by a replay engine in the control port of the switch.

If forward error correction has less latency (982), the method of FIG. 8 includes using forward error correction (972). As mentioned above, forward error correction may be carried out by a FEC engine in the control port of the switch.

The method of FIG. 8 illustrates, the importance of using FEC to detect errors which is inherently a very low-latency operation and using link-level replay to correct errors. As mentioned above, CRC is not well-adapted to detect burst errors. However, FEC is well-adapted to detect errors but FEC correction has high latency. As such, the combination of FEC detection and replay correction provides optimal latency and detection For further explanation, FIG. 9 sets forth a flow chart illustrating a method of burst error correction in a high-performance computing environment according to embodiments of the present invention. The method of FIG. 9 is similar to the method of FIG. 8 in that the method of FIG. 9 includes receiving (954), at a switch (102), one or more packets (958) and one or more codewords (962) associated with the one or more packets (958); determining (966), by the switch (102) in dependence upon a link-level replay algorithm (968), whether forward error correction (998) has higher latency than a link-level replay (968); and if link-level replay has less latency (980) than forward error correction (998), requesting (970), by the switch (102), a link-level replay; and using forward error correction (972) if forward error correction has less latency (982).

Figure 9:
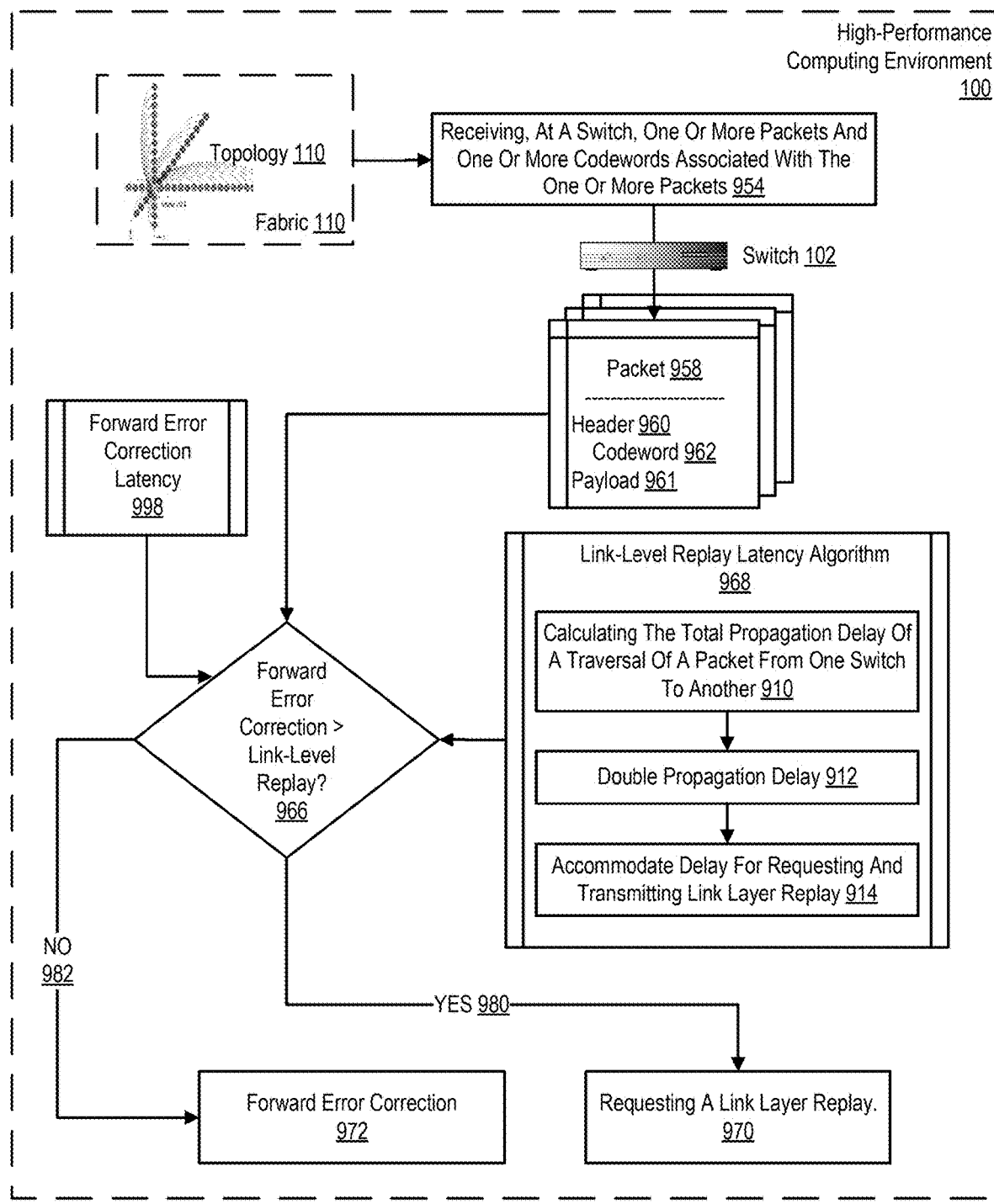
FIG. 9 sets forth a flowchart illustrating a method of burst error correction according to embodiments of the present invention.

In the method of FIG. 9, determining (966), by the switch (102) in dependence upon a link-level replay algorithm (968), whether forward error correction has higher latency than a link-level replay includes calculating (910) the total propagation delay of a traversal of a packet from one switch to another. In the method of FIG. 9, the total propagation delay includes the delay in the transmission of a packet including the delay to traverse a link and the time to land a codeword.

The total propagation delay may be represented as:

$$T_{pd} = t_{tx} + t_i + t_{rx} + t_{land}$$

where:
$T_{pd}$=elapsed time for one bit to completely traverse the link in one direction
$t_{tx}$=propagation delay of Tx PHY, in ns
$t_i$=propagation delay of interconnect, in ns
$t_{rx}$=propagation delay of Rx PHY, in ns
$t_{land}$=elapsed time to land an entire codeword in the receive buffer In many embodiments, the time to traverse a link is approximated with a delay multiplier. The propagation delay for a given link ($t_i$) is a function of the length of the interconnect. In general, typical links in use in the networking industry (both copper and fiber) exhibit a propagation delay of ~5 ns/m. This means $t_i$ can be approximated using $$t_i = l_i * 5$$

where $l_i$ is in meters

Those of skill in the art will recognize that the 5 ns/m propagation delay multiplier is an approximation. A more accurate figure can be obtained by dividing the propagation delay of light in a vacuum (3.33 ns/m) by the square root of the effective dielectric constant of the transmission medium for electrical transmission or by the refractive index of the medium for optical transmission.

In the method of FIG. 9 includes determining (966), by the switch (102) in dependence upon a link-level replay algorithm (968), whether forward error correction has higher latency than a link-level replay includes calculating (912) twice the total propagation delay of a traversal of a packet from one switch to another. The baseline 'cost' for data to traverse the link is $T_{pd}$. If the data is determined to be erroneous and is subsequently corrected using a link-level replay ('LLR'), an additional minimum of $2*T_{pd}$ is required to complete transmission of the data. One $T_{pd}$ time interval is consumed by the receiving port communicating back to the transmitting port that a replay is needed. The second $T_{pd}$ is consumed as the replayed data traverses the link.

In the method of FIG. 9, determining (966), by the switch (102) in dependence upon a link-level replay algorithm (968), whether forward error correction has higher latency than a link-level replay includes accommodating a (914) delay time for requesting a link-level replay and transmitting a link-level replay. One skilled in the art will also recognize that a non-zero processing time is required at each port. That is, there is a delay to request the replay at the receiving port and a delay to initiate the replay at the transmitting port. This processing time may be included as an additional delay parameter.

Therefore, the total overhead associated with error detection using FEC and correction using replay is:

$$T_{FEC\_detect\_and\_replay\_correct} = t_{detect} + 2*T_{pd}$$

Therefore when $$T_{FEC\_detect\_and\_replay\_correct} < t_{correct\_FEC}$$

then link-level replay is a lower-latency error correction mechanism than RS-FEC error correction for that particular link (at any BER). This is often the case for short interconnects.

Figure 10:
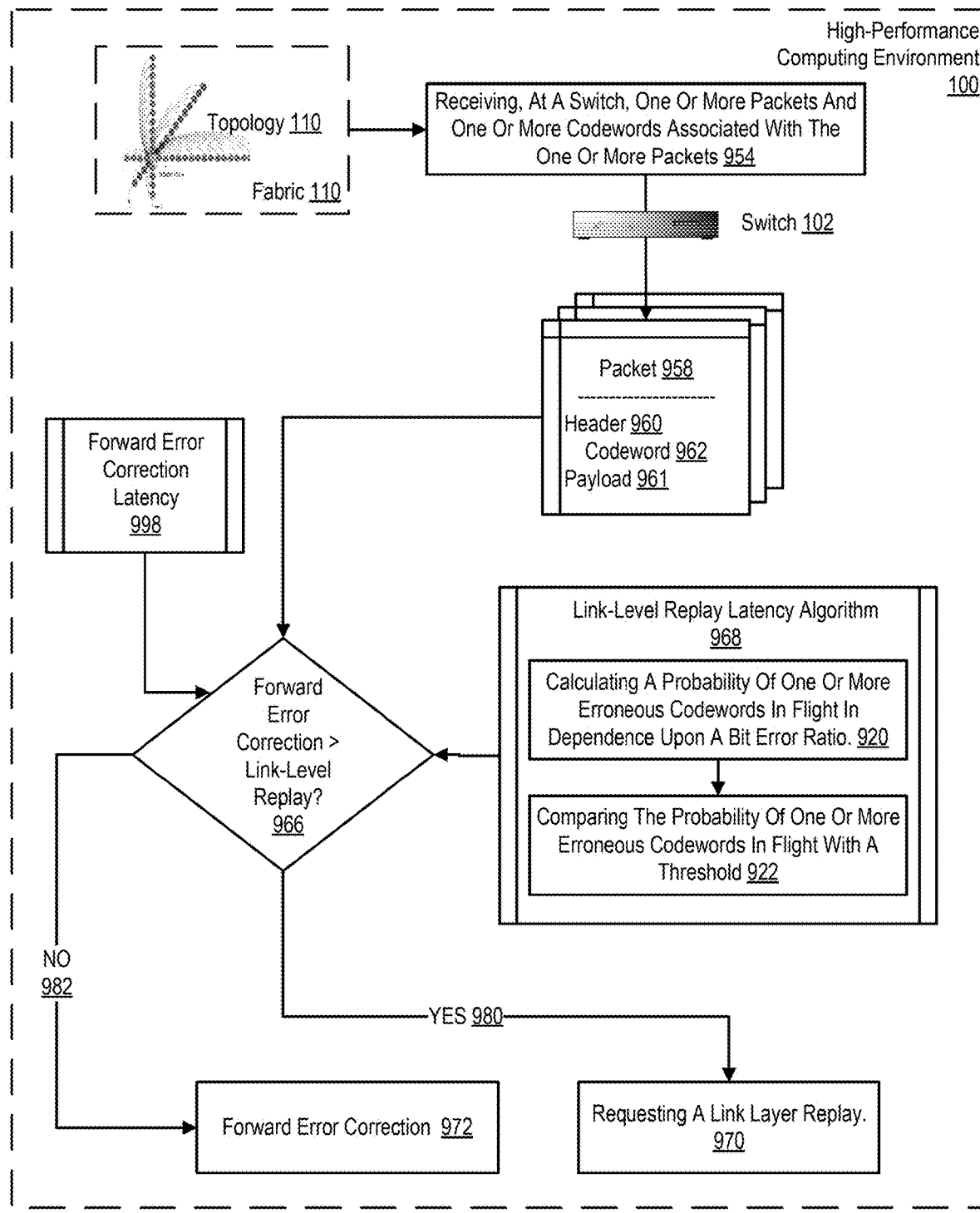
FIG. 10 sets forth a flowchart illustrating a method of burst error correction according to embodiments of the present invention.

For further explanation, FIG. 10 sets forth a flow chart illustrating a method of burst error correction in a high-performance computing environment according to embodiments of the present invention. The method of FIG. 10 is similar to the method of FIG. 8 and FIG. 9 in that the method of FIG. 10 includes receiving (954), at a switch, one or more packets and one or more codewords associated with the one or more packets; determining (966), by the switch (102) in dependence upon a link-level replay algorithm (968), whether forward error correction has higher latency than a link-level replay; and if link-level replay has less latency (980) than forward error correction (998), requesting (970), by the switch (102), a link-level replay; and using forward error correction (970) if forward error correction (998) has less latency.

In the method FIG. 10, determining (966), by the switch (102) in dependence upon a link-level replay algorithm (968), whether forward error correction has higher latency than a link-level replay includes calculating (920) a probability of one or more erroneous codewords in flight in dependence upon a bit error ratio.

Bit error ratio is defined as:

$$BER = \frac{\text{erroneous bits}}{\text{bits transmitted}}$$

When Reed Soloman forward error correction ('RS-FEC') is used for correction, all codewords are processed by the RS-FEC correction circuitry, even if they turn out to be error-free. Therefore, the latency overhead for FEC is flat. However, BER is not. Therefore, the latency overhead of error correction using replay is dependent on the BER of the link. As the number of errors on the link increases, the number of required replays also increases, increasing the average latency overhead and decreasing available link bandwidth.

The probability of an erroneous codeword in flight can be calculated, given the number of bits on the wire:

$$P_{err} = 1 - (1 - BER)^{N_b}$$

where $$N_b = B_r * T_{pd}$$

In the method of FIG. 10, determining (966), by the switch (102) in dependence upon a link-level replay algorithm (968), whether forward error correction has higher latency than a link-level replay includes comparing (922) the probability of one or more erroneous codewords in flight with a threshold.

The $P_{err}$ equation reveals the dependency on both BER and link length in determining when to use FEC correction and when to use replay correction with FEC detection. Those skilled in the art will recognize that, as $P_{err}$ approaches 1, the risk of a "double replay" increases. A double replay is a replay that occurs while data is already being replayed, further increasing latency and decreasing available bandwidth. Double replays are minimized when $P_{err}$ is small, with 0.1 or even 0.01 being a good target maximum.

The evaluation of when to use replay vs FEC correction can also be made by calculating the average additional latency for a given bit to successfully traverse the link.

$$T_{avg\_replay\_latency} = \frac{P_{err}}{1 - P_{err}} * T_{FEC\_detect\_and\_replay\_correct}$$

So now the previous BER-independent comparison can be reevaluated with BER comprehended, such that low BER links with fairly low $T_{pd}$ can also be handled with replay. Note that both comparisons assume $P_{err} < 1$ and preferably much less than 1.

In summary, when $$T_{FEC\_detect\_and\_replay\_correct} < t_{correct\_FEC}$$

Replay exhibits lower maximum latency compared to FEC for any BER, assuming $P_{err}$ is much less than 1.

Replay may still exhibit lower average latency than FEC when $$T_{avg\_replay\_latency} < t_{correct\_FEC}$$

Otherwise, FEC correction should be used.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of burst error correction in a high-performance computing environment, the high-performance computing environment including a plurality of links and switches, the method comprising:
   receiving, at a switch, one or more packets and one or more codewords associated with the one or more packets;
   determining, by the switch in dependence upon a link-level replay latency algorithm, whether forward error correction has higher latency than a link-level replay; and
   if link-level replay has less latency than forward error correction, requesting, by the switch, a link-level replay; and
   using forward error correction if forward error correction has less latency.

2. The method of claim 1 wherein determining, by the switch, whether forward error correction has higher latency than a link-level replay includes calculating a total propagation delay of a traversal of a packet from one switch to another.

3. The method of claim 2 wherein the total propagation delay includes the propagation delay of the packet including a transmission of the packet, a time to traverse a link, a reception of the packet, and a time to land a codeword.

4. The method of claim 3 wherein the time to traverse a link is approximated with a delay multiplier.

5. The method of claim 2 wherein determining, by the switch, whether forward error correction has higher latency than a link-level replay includes calculating twice the total propagation delay of a traversal of a packet from one switch to another.

6. The method of claim 5 determining, by the switch, whether forward error correction has higher latency than a link-level replay includes accommodating a delay time for requesting a link-level replay and transmitting a link-level replay.

7. The method of claim 1 wherein determining, by the switch, whether forward error correction has higher latency than a link-level replay includes calculating a probability of one or more erroneous codewords in flight in dependence upon a bit error ratio.

8. The method of claim 1 wherein determining, by the switch, whether forward error correction has higher latency than a link-level replay further comprises comparing a probability of one or more erroneous codewords in flight with a threshold.

9. A system of burst error correction in a high-performance computing environment, the high-performance computing environment including a plurality of links and switches, the system comprising a plurality of switches and links configured for:
- receiving, at a switch, one or more packets and one or more codewords associated with the one or more packets;
- determining, by the switch in dependence upon a link-level replay latency algorithm, whether forward error correction has higher latency than a link-level replay; and
- if link-level replay has less latency than forward error correction, requesting, by the switch, a link-level replay; and
- using forward error correction if forward error correction has less latency.

10. The system of claim 9 wherein determining, by the switch, whether forward error correction has higher latency than a link-level replay includes calculating a total propagation delay of a traversal of a packet from one switch to another.

11. The system of claim 10 wherein the total propagation delay includes the propagation delay of the packet including a transmission of the packet, a time to traverse a link, the reception of the packet, and a time to land a codeword.

12. The system of claim 11 wherein the time to traverse a link is approximated with a delay multiplier.

13. The system of claim 10 wherein determining, by the switch, whether forward error correction has higher latency than a link-level replay includes calculating twice the total propagation delay of a traversal of a packet from one switch to another.

14. The system of claim 13 determining, by the switch, whether forward error correction has higher latency than a link-level replay includes accommodating a delay time for requesting a link-level replay and transmitting a link-level replay.

15. The system of claim 9 wherein determining, by the switch, whether forward error correction has higher latency than a link-level replay includes calculating a probability of one or more erroneous codewords in flight in dependence upon a bit error ratio.

16. The system of claim 9 wherein determining, by the switch, whether forward error correction has higher latency than a link-level replay further comprises comparing a probability of one or more erroneous codewords in flight with a threshold.

17. A switch with burst error correction in a high-performance computing environment, the switch including a burst error module comprising logic configured for:
- receiving, at a switch, one or more packets and one or more codewords associated with the one or more packets;
- determining, by the switch in dependence upon a link-level replay latency algorithm, whether forward error correction has higher latency than a link-level replay; and
- if link-level replay has less latency than forward error correction, requesting, by the switch, a link-level replay; and
- using forward error correction if forward error correction has less latency.

18. The switch of claim 17 wherein the logic configured for determining, by the switch, whether forward error correction has higher latency than a link-level replay includes logic configured for calculating a total propagation delay of a traversal of a packet from one switch to another.

19. The switch of claim 17 wherein the total propagation delay includes the propagation delay of the packet including a transmission of the packet, a time to traverse a link, a reception of the packet, and a time to land a codeword.

20. The switch of claim 19 wherein the time to traverse a link is approximated with a delay multiplier.

* * * * *